UNITED STATES PATENT OFFICE.

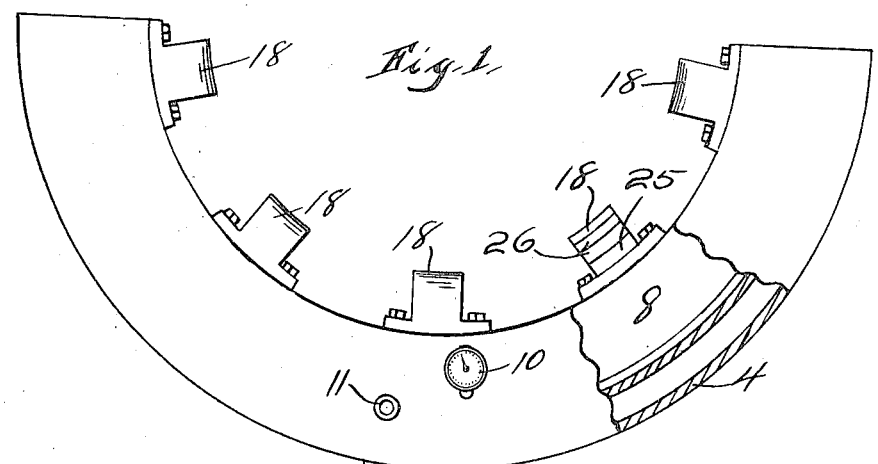
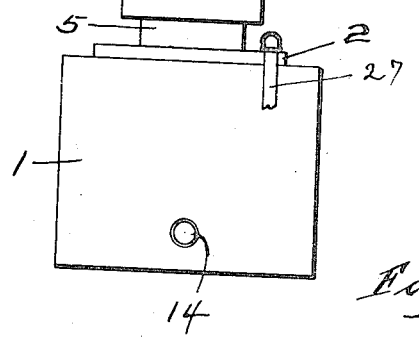
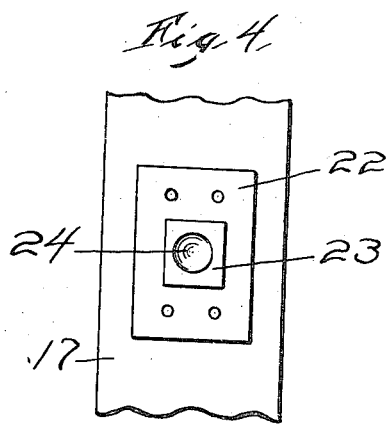
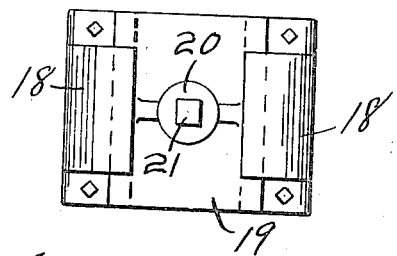

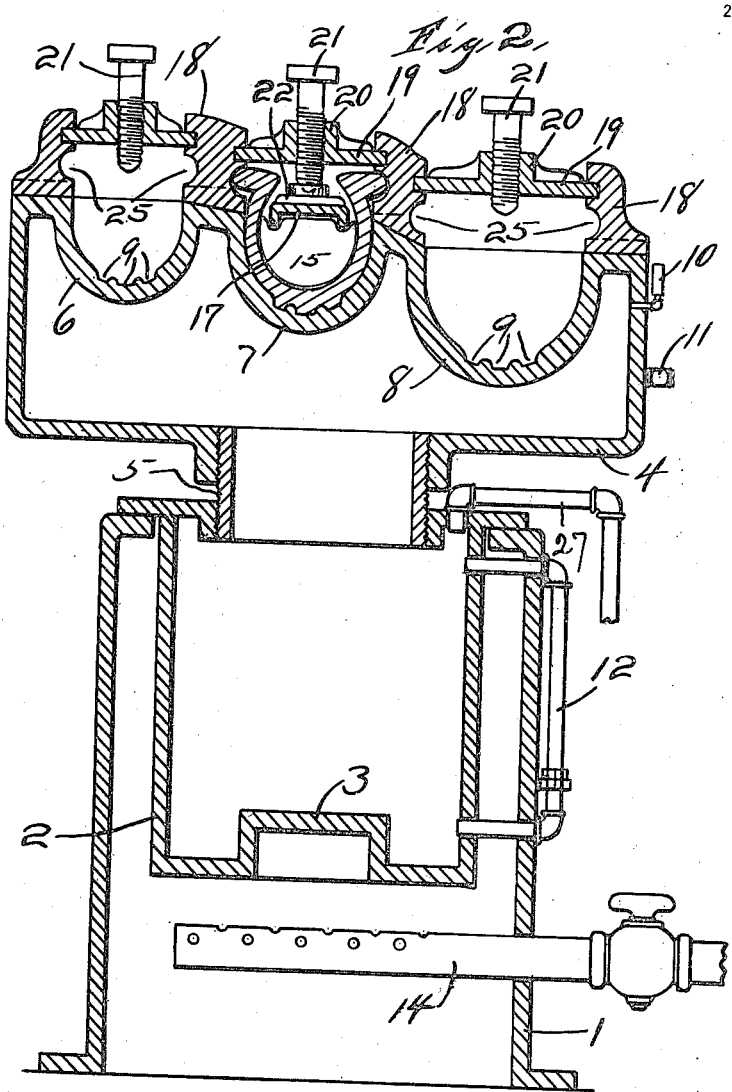

PHILIP P. BONGIO AND ELONZO STEPHENSON, OF FORT WORTH, TEXAS.

APPARATUS FOR CURING TIRE-CASINGS.

1,307,079.  Specification of Letters Patent.  Patented June 17, 1919.

Application filed February 11, 1919. Serial No. 276,255.

*To all whom it may concern:*

Be it known that we, PHILIP P. BONGIO and ELONZO STEPHENSON, both citizens of the United States of America, residing at Fort Worth, in the county of Tarrant and State of Texas, have invented certain new and useful Improvements in Apparatus for Curing Tire-Casings, of which the following is a specification.

Our invention relates to molding devices for curing tire casings and more particularly for rebuilding or retreading tire casings for pneumatic tires, and the object is to provide apparatus which is easily and quickly set up and knocked down and which will hold casings safely in position while being cured and to provide apparatus which will be highly efficient in curing tire casings. Other objects and advantages will be fully explained in the following description and the invention will be more particularly pointed out in the claims.

Reference is had to the accompanying drawings which form a part of this application.

Figure 1 is a side elevation of the apparatus. Fig. 2 is a vertical section of the same. Fig. 3 is a plan view of one set of pressing devices. Fig. 4 is a broken view of the channel pressing plate, showing one of the pressing shoes thereon. Fig. 5 is a plan view of one side of one of the pressing devices.

Similar characters of reference are used to indicate the same parts throughout the several views.

Our invention includes a complete vulcanizing plant. The base 1 constitutes a furnace chamber for heating purposes. A boiler 2 is suspended in the furnace chamber so that the heat from the burner will heat the bottom of the boiler and the four sides. The boiler 2 has a portion 3 of the bottom projected inwardly to form a cavity for increasing the surface.

The curing mold 4 is mounted on the boiler by a neck or pipe section 5 which is screwed into the top of the boiler and also into the bottom of the mold. The mold box 4 has a plurality of tire curing forms or molds 6, 7, and 8 formed in the inner periphery thereof. The molds are semi-circular or somewhat more than a semi-circle in form in order to cure one half of a tire casing at a time. The molds 6, 7, and 8 may have curved grooves 9 for forming beads on the tire casings. Each mold 6, 7, or 8 is adapted to cure several different sizes of tires or casings and the three different molds will answer the purposes of treating all ordinary sizes of casings except abnormally large tire casings. A safety valve 11 is provided for the boiler 2 and mold box 4. A steam gage 10 is also provided for indicating the steam pressure in the steam chamber. A water gage 12 is provided for the boiler 2. A burner pipe 14 is provided for heating the boiler with gas or oil. A water pipe 27 is provided for supplying water to the boiler 2.

The casings are placed in the molds and a sand bag 15 is mounted in the casing. A curved channel bar 17 having the general contour of the molds is mounted on the sand bag 15. Means are provided for exerting pressure on the sand bag. Clamps 18 are bolted to the mold box 4 in pairs. These clamping members 18 are rigid with the molds and mold box. Resistance blocks or plates 19 are loosely mounted in the clamps 18; these having recesses in their inner faces to receive the plates or pressure resisting members 19. The plates 19 have bosses 20 on their upper sides and carry screw bolts 21 for exerting pressure on the channel pressing plate 17. Shoes 22 are carried by the channel plate 17 and bosses 23 are formed on the shoes 22 and sockets 24 are formed in the bosses 23 for the ends of the bolts 21. As the bolts 21 are screwed down, they will press on the channel pressing plate 17 and the plates 19 will resist the pressure of the bolts and so force the channel plate down on the sand bag 15 and the clamps 18 will prevent the moving of the plates 19 away from the mold box. Any one of the molds 6, 7, and 8 or all of them may be used simultaneously for curing the tire casings. All the force that is exerted by the bolts will take effect on the channel plate 17 and thus press on the sand bag 15. The sand bag will be forced to all parts of the inner face of the tire casing, thus press the casing against the hot molds and make a smooth finish for the surface of the tire casing on the outside or periphery. In placing the casings in the molds, the beads of the tire occupy the grooves 25 in the clamping members 18.

What we claim, is,—

1. An apparatus for curing tire casings comprising a boiler, a curved curing form rectangular in cross-section and having a plurality of curved casing holding forms formed integral with the interior or concave side of said form and suspended within the space within said form, a nipple connecting said curing form to said boiler, clamping members attached to the concave edges of said casing holding forms provided with grooves in the sides thereof for pressure resisting plates and curved grooves for the beads of the tire casings, pressure resisting plates mounted in the first named grooves provided with bosses thereon, a sand bag and a curved channel plate for each casing holding form, and screw bolts projecting through said bosses and plates for exerting pressure on said channel plate.

2. An apparatus for curing tire casings comprising a water heater, a curved steam chamber rectangular in cross-section and having a plurality of curved casing holding forms formed integral with the concave side of said steam chamber and suspended within said chamber, clamps attached to the edges of said forms and having grooves in the sides thereof for pressure resisting plates and curved grooves for the beads of tire casings, pressure resisting plates loosely mounted in said first named grooves and provided with bosses integral therewith, a nipple connecting said water heater and steam chamber, a sand bag and a curved channel plate for each casing holding form, screw bolts operating through said bosses and plates for exerting pressure on said channel plates, means for supplying water to said water heater, and means for heating said water heater.

In testimony whereof we set our hands this 31st day of December, 1918.

PHILIP P. BONGIO.
ELONZO STEPHENSON.